(12) United States Patent
Slocum et al.

(10) Patent No.: US 6,280,126 B1
(45) Date of Patent: Aug. 28, 2001

(54) DAMPED TOOL HOLDER AND METHOD

(75) Inventors: Alexander H. Slocum, Bow; Kevin Wasson, Dunborton, both of NH (US)

(73) Assignee: AESOP, Inc., Concord, NH (US)

( * ) Notice: Subject to any disclaimer, the term of this patent is extended or adjusted under 35 U.S.C. 154(b) by 0 days.

(21) Appl. No.: 09/404,623

(22) Filed: Sep. 23, 1999

(51) Int. Cl.[7] .................................................. B23B 31/02
(52) U.S. Cl. ........................... 409/141; 279/52; 408/143; 408/239 R; 409/234
(58) Field of Search ................................. 408/1 R, 143, 408/56, 57, 59, 239 R; 279/20, 52, 56; 409/131, 141, 232, 234

(56) References Cited

U.S. PATENT DOCUMENTS

| | | | |
|---|---|---|---|
| 3,364,800 | * | 1/1968 | Benjamin et al ..................... 408/143 |
| 4,320,999 | * | 3/1982 | Briese ..................................... 408/59 |
| 4,705,439 | * | 11/1987 | Hoyle et al. ............................ 408/56 |
| 5,378,091 | * | 1/1995 | Nakamura ............................... 408/57 |
| 5,405,220 | * | 4/1995 | Ishikawa ................................ 408/56 |
| 5,462,293 | * | 10/1995 | Samelius et al. ..................... 408/143 |
| 5,649,714 | * | 7/1997 | Uchida et al. .......................... 408/57 |
| 5,674,032 | * | 10/1997 | Slocum et al. .......................... 408/57 |

* cited by examiner

Primary Examiner—Daniel W. Howell
(74) Attorney, Agent, or Firm—Rines and Rines

(57) ABSTRACT

A damped tool holder system having, in combination, a longitudinally extending cylindrical tool provided with a forward outer cutting or operating end and a rearward inner end which is to be held within a tool holder; a coaxial tool holder receiving the inner end of the tool; a rigid mechanical support connection between the tool and the tool holder at a first region thereof; and a second annular support connection between the tool and the tool holder at a second region thereof spaced from but adjacent the first region and effected by a vibration damping annular film structure disposed therebetween at said second region.

9 Claims, 10 Drawing Sheets

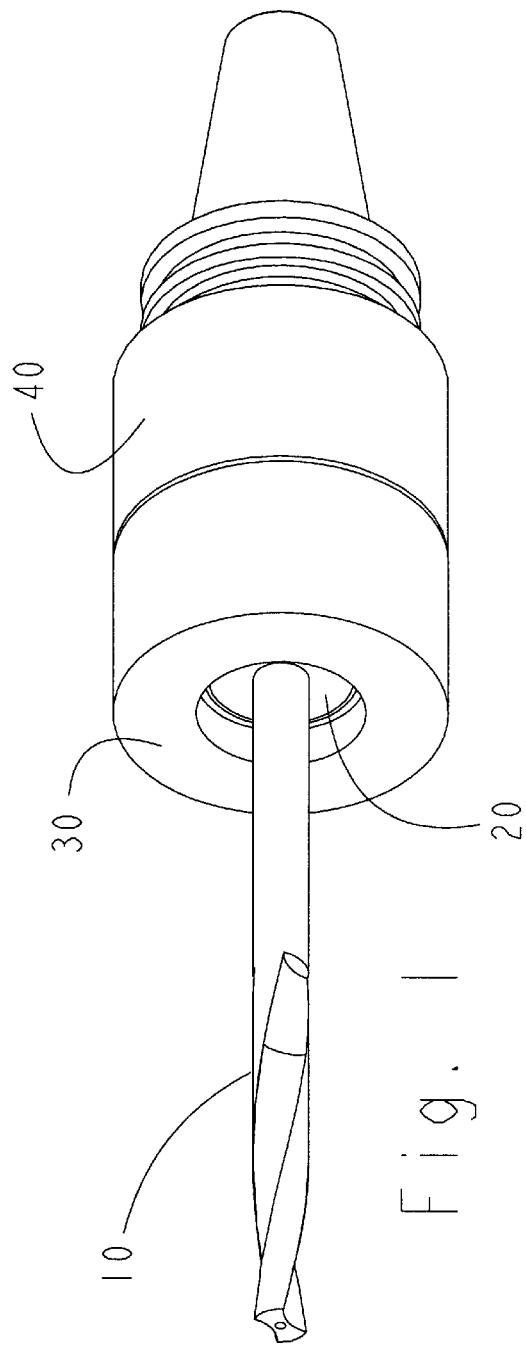
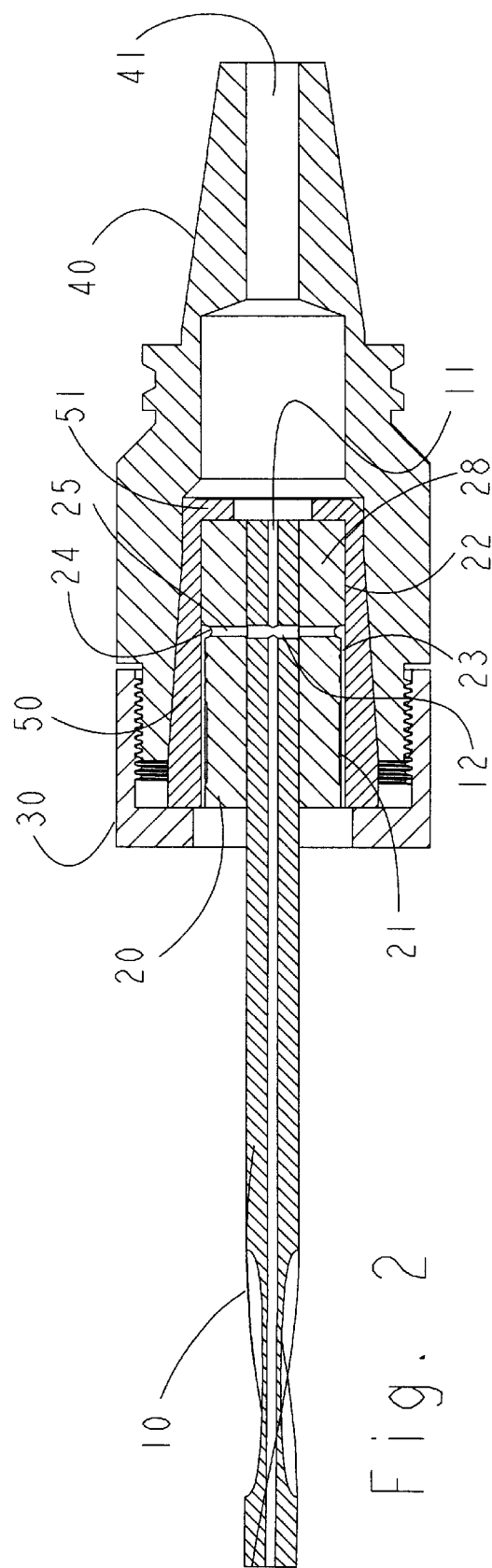

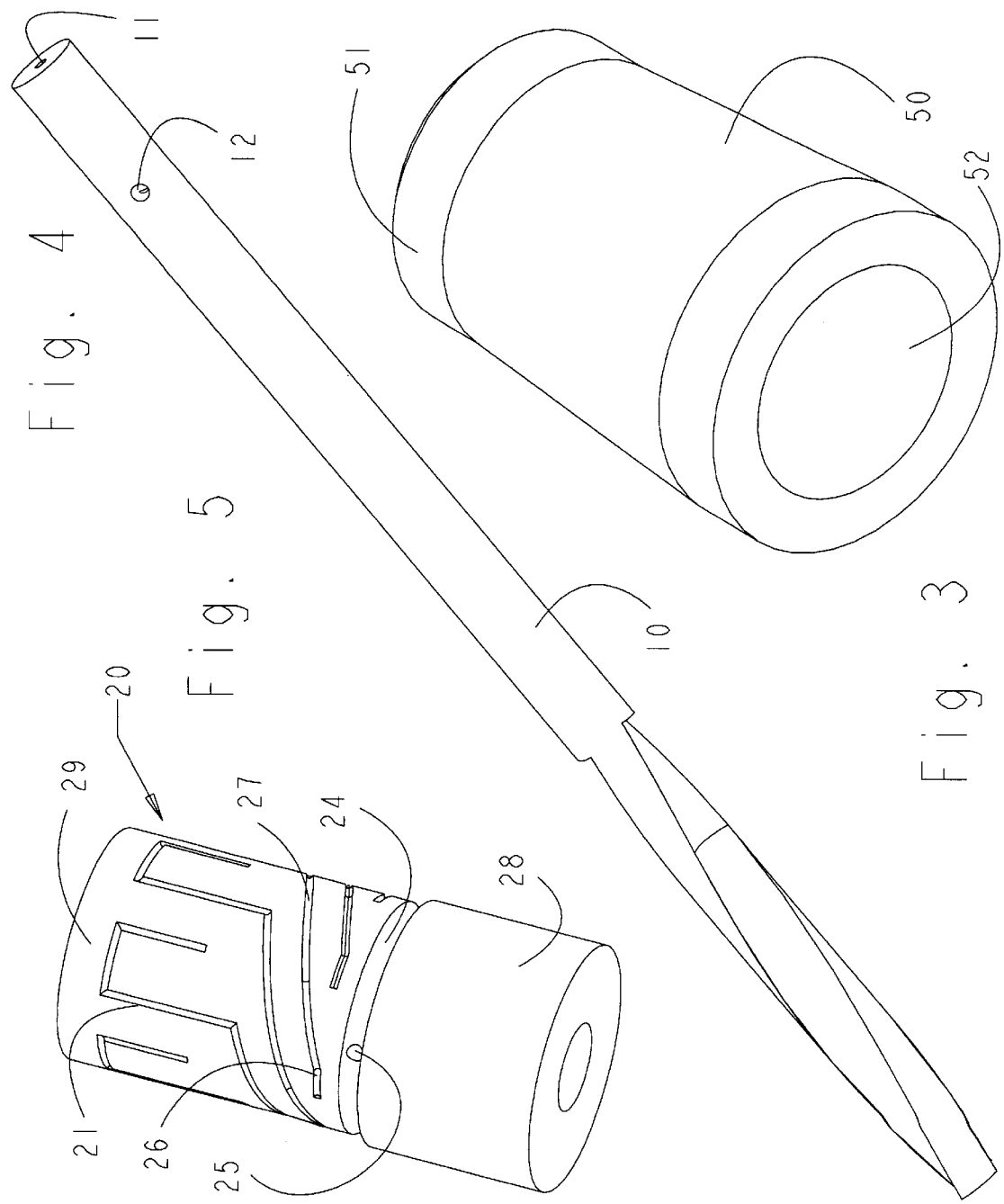

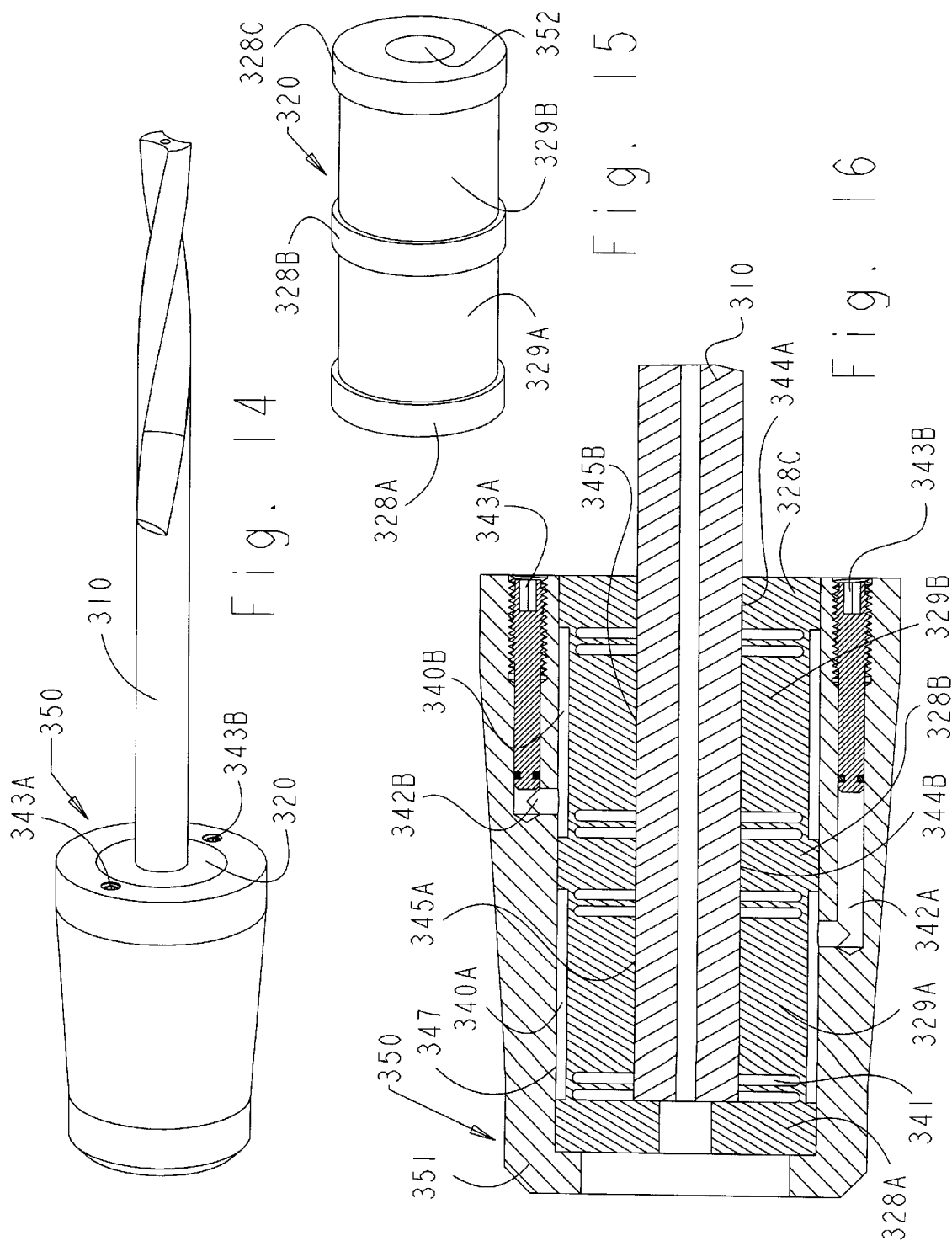

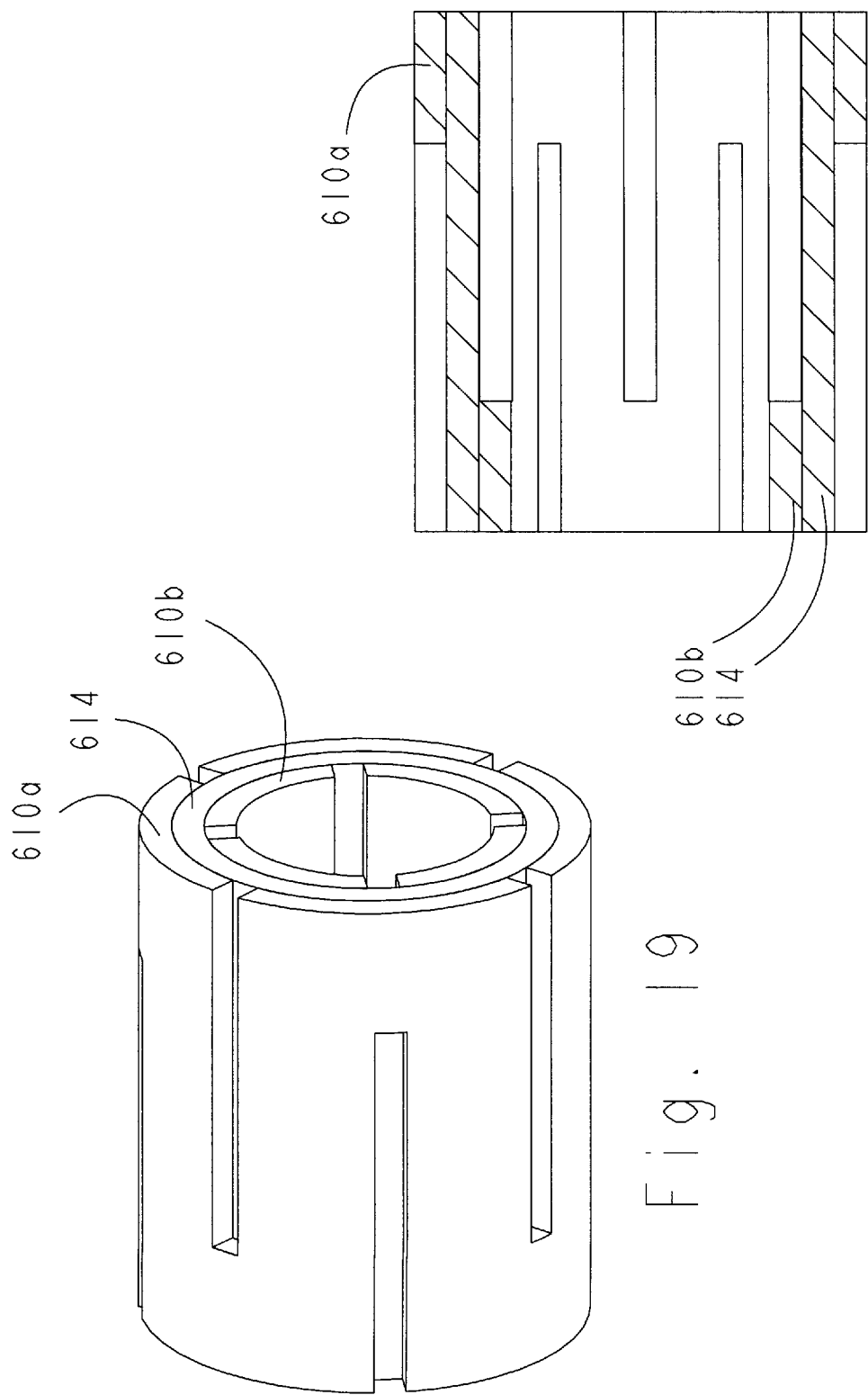

DAMPED TOOL HOLDER AND METHOD

The present invention relates to tool holders used in machine tool spindles and the like, being more particularly concerned with the problems arising from the vibration and chatter of such tools in operation as they are held in their holder at their inner ends, where the tool is held at one region by a rigid clamping action.

BACKGROUND

Machine tool spindles use tool holders, such as HSK or CAT type tool holders, to allow for the facile and automatic changing of tools. The tool holders accommodate different size tools through the use of inserts or collets, and they rigidly clamp a tool at its inner end (shank) so that the dominant compliance is the cantilevered tool itself. Long tools, particularly, are prone to vibration and chatter, and their holders provide little damping. Some inserts use hydraulic fluid to create pressure on a membrane which squeezes the tool (a typical unit is sold under the name HydroLock), but then fluid film gaps are large, and the pressure is isostatic, and the clamping/damping is applied at one point only, so bending moments are poorly resisted/damped.

OBJECT OF THE INVENTION

A principal object of this invention, accordingly, is to provide a new and improved modular damped tool holder and holding method that will not only grip the tool rigidly at its inner region, but will also provide support at an adjacent annular region with a damping structure that imparts good stiffness and damping for the tool, as well.

A further objective is to enable the tuning of the relative tool length and diameter to the damping region length and diameter and damping coefficient, readily to optimize the damping and stiffness.

Another objective of the invention is to provide such a novel structure that can accommodate as a damper structure, a surface self-compensated hydrostatic bearing damping structure, a passive fluid filled cavity with non-circumferential leakage seals to act as the damping structure, or a viscoelastic or other damping material around the toolshank to act as the damping structure, or the like, and in a modular construction that can be easily used with standard tool holders.

Other and further objectives will be pointed out hereafter and are more particularly delineated in the appended claims.

SUMMARY

In summary, the invention embraces a damped tool holder system having, in combination, a longitudinally extending cylindrical tool provided with a forward outer cutting or operating end and a rearward inner end which is to be held within a tool holder; a coaxial tool holder receiving the inner end of the tool; a rigid mechanical support connection between the tool and the tool holder at a fist region thereof; and a second annular support connection between the tool and the tool holder at a second region thereof spaced from but adjacent the first region and effected by a vibration damping annular film structure disposed therebetween at said second region.

Specifically, the tool is held rigidly at its inner end region in the holder, as by a shrink-fit or press-fit, and it is supported at another spaced but adjacent region by a damping structure, which also provides for centering of the tool with a high spring rate, while achieving a large degree of damping of the vibration and the chatter of the tool in use. To make the system modular, a standard tool holder can be used, and a sleeve can be shrunk over the tool to maximize the diameter of the effective damping region. The sleeve is then rigidly held at one end within a solid collet, and an annulus of damping structure provides support in the region between the other end of the sleeve and the solid collet. The solid collet, in turn, is anchored into the standard tool holder, in a manner similar to a standard slit collet. Damping structure embodiments in the region adjacent to the damped inner end of the tool may include the use of a hydrostatic bearing, a passive fluid-filled squeeze film zone, a viscoelastic material or an otherwise lossy material. The principle is also applied to a damped toolholder where the tool is also clamped in the toolholder at two or more spaced but adjacent regions to damp moment loads applied to the tool.

To effectuate the above, the effective shank diameter of the tool, in the preferred embodiments, is increased to a standard size using a sleeve that can be shrunk fit or pressed over the tool shank, or the shank of the tool may be monolithically increased to a standard size. The sleeve then fits into the cylindrical bore of a tapered sleeve collet (without the slits), and is help clamped at the inner end, typically by such shrink or press fit, and with a small clearance left between the sleeve and the inside of the solid collet. In this small clearance region adjacent to the clamped end region, a damping structure, such as a cylindrical surface self-compensated hydrostatic bearing, or a sealed passive fluid film annulus, or a viscoelastic or other lossy material annulus, as before mentioned, acts to provide stiffness and damping to the sleeve with respect to the solid collet. The collet itself is rigidly held in the standard toolholder by a nut that clamps it in place.

In the case where the damping structure is a hydrostatic bearing, as is later-explained in FIG. 1, fluid for the hydrostatic bearing may be introduced by a fluid commutator; or, more typically, by the same system that is commonly used to supply high pressure cutting fluid to the center of the tool (through-tool cooling). A hold supplied in the through-tool cooling supply, as later more fully explained in connection with hereafter described FIGS. 1–4, will bleed off some of the coolant to the surface self-compensated hydrostatic bearing, and exit fluid from the bearing is then either collected and channeled back into the tool, or it may flow out the front of the tool holder to wash over the part being machined. For the case of a modular toolholder that allows the tool to be easily changed, screws may force fluid into two distinct zones (as later explained in connection with the embodiment of hereinafter described FIG. 14) acting as a force couple to dampen bending moment vibrations applied to the tool by squeeze film mechanisms.

Preferred and best mode embodiments and designs are later described in detail.

DRAWINGS

The invention will now be described with reference to the accompanying drawing in which:

FIG. 1 shows an isometric view of a hydrostatic tool holder system constructed in accordance with the invention;

FIG. 2 is a cross section of the hydrostatic tool holder system of FIG. 1;

FIG. 3 is an isometric view of the preferred solid collet used in FIGS. 1 and 2;

FIG. 4 is an isometric view of the tool with its added radial hole in the shank to channel fluid to the hydrostatic bearing;

FIG. 5 is an isometric view of the sleeve that is press-fit over the tool and inserted into the solid collet of FIGS. 1–3;

FIG. 14 is an isometric view of the before-mentioned further modification using damped two-region clamping in the toolholder;

FIG. 15 is an isometric view of the insert used in FIG. 14, showing the two distinct clamping/damping zones ore regions;

FIG. 16 is a sectional view of the damped toolholder of FIG. 14;

FIG. 19 is an isometric view of the use of a viscoelastic or other lossy material sandwiched between inner and outer collet rings; and FIG. 20 is a cross sectional view of the damped rings of FIG. 19.

THE INVENTION

Figure 6:
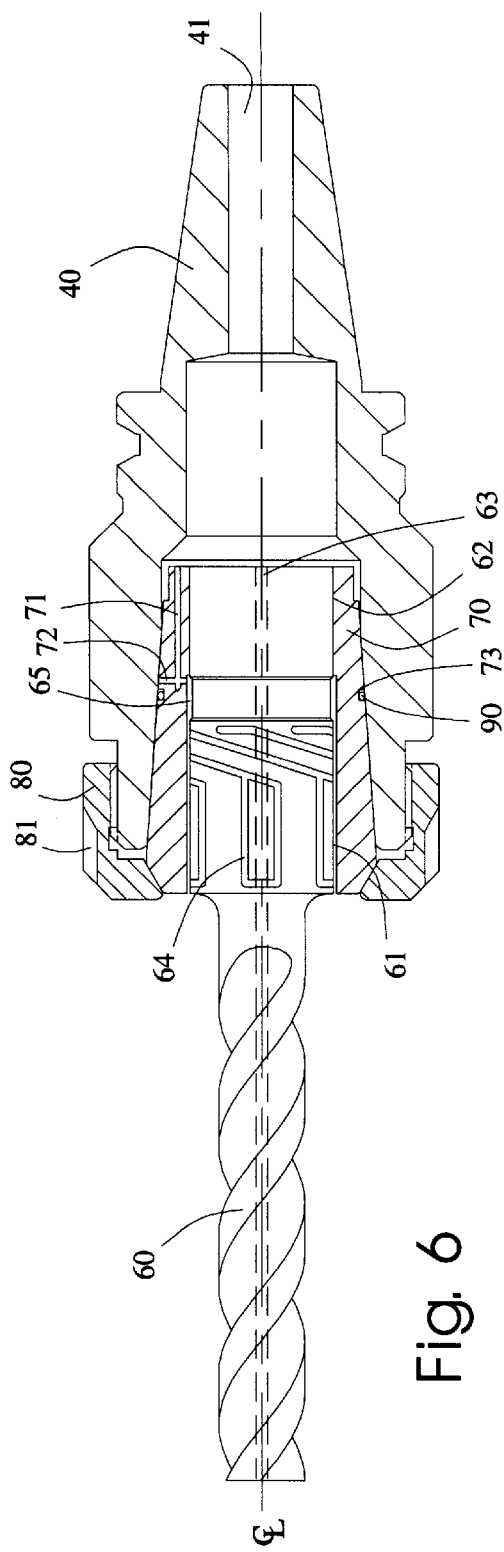
FIG. 6 is a cross section of a tool holder system in which the hydrostatic bearing grooves are formed onto the surface of the tool itself.

FIGS. 1 and 2 show a preferred damped tool holding system constructed in accordance with the invention, and which uses hydrostatic bearings as the damping structure. The longitudinal tool 10 is held alone its rear inner end region in a sleeve 20–28 as by a shrink-fit, and the rear sleeve 28, in turn, is held in a solid collet 50 by a shrink-fit 22, at the inner end region of the tool. Thrust forces are further resisted by rear flange 51. The tool is thus held clamped at its inner end region in the region of coaxial sleeve portion 28. In the adjacent region forward of the inner end, a small annular gap 23, typically on the order of tens of microns, is provided between the forward sleeve section 20 and the collet 50. A coaxial hydrostatic damping bearing surface 23 supports a fluid damping annulus film that, in turn, provides an annular support inner region adjacent the forward region of the collet 50. In this configuration, the rear or inner end region of the tool is effectively rigidly simply supported at 22, and the adjacent region forward thereof along sleeve 20 provides a second tool holding region, this forward region being held by a squeeze film-damped stiff hydrostatic bearing (spring) 21. Thus DC radial cutting forces on the tool 10 will be resisted and accuracy during heavy cuts will be maintained while alternating vibration forces on the tool will be damped.

As shown in FIG. 2, the solid collet 50 is held in a standard tool holder 40 by a front nut 30 that forces the corresponding tapers between the outer wall of the collet and the inner wall of holder 40 to engage. The left-hand end 41 of the tool holder 40 may have any of many standard ends attached to it, depending on the drawbar and through-tool coolant system used on the machine tool. Fluid is typically introduced through 41, and often a standard tooling system fitting will deliver the high-pressure fluid to an axial hole 11 in the end of the tool. As shown in FIG. 4, in this system, an additional radial hole 12 is provided aligned with a recessed hole 25 in a groove 24 between sleeves 20 and 28 to bleed off some of the pressurized coolant to direct it to hole 25 and deliver it to groove 24 that supplies fluid to the hydrostatic bearing surface 21.

To summarize, surface self-compensated bearings are the subject of U.S. Pat. No. 5,700,092 of the present applicants, Wasson and Slocum. FIG. 5 shows the forward sleeve 20 in greater detail, with rigidly held region 28 being tens of microns larger in diameter than bearing/damping gap region 23, as before explained. Fluid enters the pressure supply groove 24 via hole 25, as just described. The fluid flow is regulated by the bearing gap 23, as shown in FIG. 2, and is collected by collector grooves 26. Helical grooves 27 bring the fluid to the opposite side of the sleeve, not shown, where picture frame or rectangular pockets 21 (the subject of U.S. Pat. No. 5,466,071 of common assignee herein) distribute the fluid while maintaining a very high degree of squeeze film damping. Damping a tool shaft by hydrostatic bearings, where the tool is powered by a turbine, is described in U.S. Pat. No. 5,674,032 of the present applicants, Wasson and Slocum, but it there involves an entire spindle assembly, whereas the contribution of the present invention addresses the needs of being able to use standard tools in standard tool holders in conventional spindles.

It should be noted, however, that if the tool 10 diameter is quite small in comparison to the diameter of the sleeve 20–28, then the stiffness of the sleeve itself may dominate, and little effective damping can be obtained. To prevent this problem with small diameter tools, the fluid supply groove 24 may be made deep—the optimizing of the design being readily achieved by design engineers using finite element methods.

FIG. 6 shows a cross section of a modified tool holder system also embodying the features of the present invention and in which the inner end of the tool 60 itself has hydrostatic bearing grooves 64 formed into its surface. The tool 60 is shrink-fitted tightly into an outer sleeve 70 at the inner end region 62. The outer sleeve 70 is held within tool holder 40 by a nut 80 which has impressions 81 that allow the nut 80 to be tightly screwed onto tool holder 40, thereby forcing the outer sleeve 70 into the tapers between the two parts. Pressurized fluid, which enters the tool holder 40 through feed hole 41, as previously described, is forced through supply holes 71 and 72 and enters the bearing supply groove 65. The fluid then passes between the bearing gap 61 and through the bearing grooves 64, and out of the tool holder assembly. Fluid may also pass through an optional feed hole 63 and out of the tool 60 at its cutting surface. An O-ring groove 73 is formed into the outer sleeve 70 in order to receive an elastomer O-ring 90 and prevent the pressurized fluid entering the tool holder 40 through feed hole 41 from leaking out between the tapers of the outer sleeve 70 and the tool holder 40.

The tool holder system of FIG. 6 yields a higher tool radial bending stiffness than that of FIG. 2 because the compliance of the fit between tool 10 and sleeve 20 has been eliminated. The tool 60, however, is more expensive to manufacture than tool 10.

Figure 7:
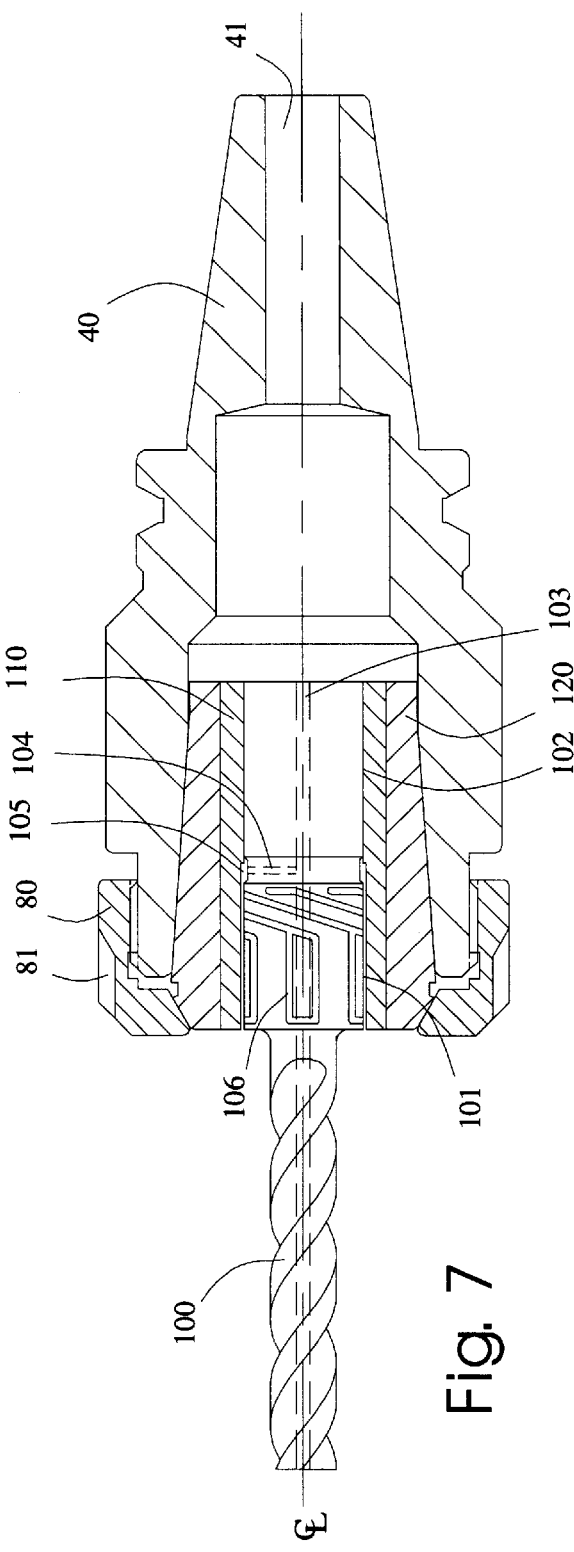
FIG. 7 is a cross section of a tool holder system in which the sleeve, which surrounds the tool, is gripped by a conventional, split-collet tool holding mechanism.

FIG. 7 shows a cross section of a further modification of a tool holder system in which the tool 100 has hydrostatic bearing grooves 106 formed into its surface, but the outer sleeve 110 is held by a conventional, split-collet tool holding mechanism. The tool 100 is shrink-fitted tightly into sleeve 110 at the base of the tool 102. Outer sleeve 110 is gripped radially by a conventional split collet 120 which is engaged by tightening the nut 80 and forcing collet 120 into the taper of tool holder 40. Pressurized fluid, again entering the tool holder 40 through feed hole 41, is forced through the hole 103 that is formed through the center of tool 100. Some of the pressurized fluid flows through feed hole 104 and into bearing supply groove 105, where it flows over through the bearing clearance 101 and through bearing grooves 106 and out of the tool holding system. Some of the fluid also continues to flow through hole 103, where it exits at the tool-cutting surface.

The tool holder system of FIG. 7 yields a lower tool radial bending stiffness than that of FIG. 6 because there is some compliance at the clearance between sleeve 110 and collet 120; but, the tool holder system of FIG. 7 has the advantage that it enables standard split collets to be used in standard tool holders.

It should be noted that the above system involves a tool with a sleeve shrunk onto it, and which has the self-compensating hydrostatic bearing features. The tool and sleeve, however, can be a monolithic part, which is the most likely configuration for large tools. In addition, for different types of tools and applications, such as very heavy radial loads, it may be appropriate to place the rigid constraint, near the front region of the tool holder, and the hydrostatic bearing near the rear of the tool holder. For dry machining applications, moreover, the hydrostatic bearing gap can be made on the order of microns, and air may be employed as the damping fluid as with groove-compensated aerostatic bearings providing a reasonable damped support.

Figure 8:
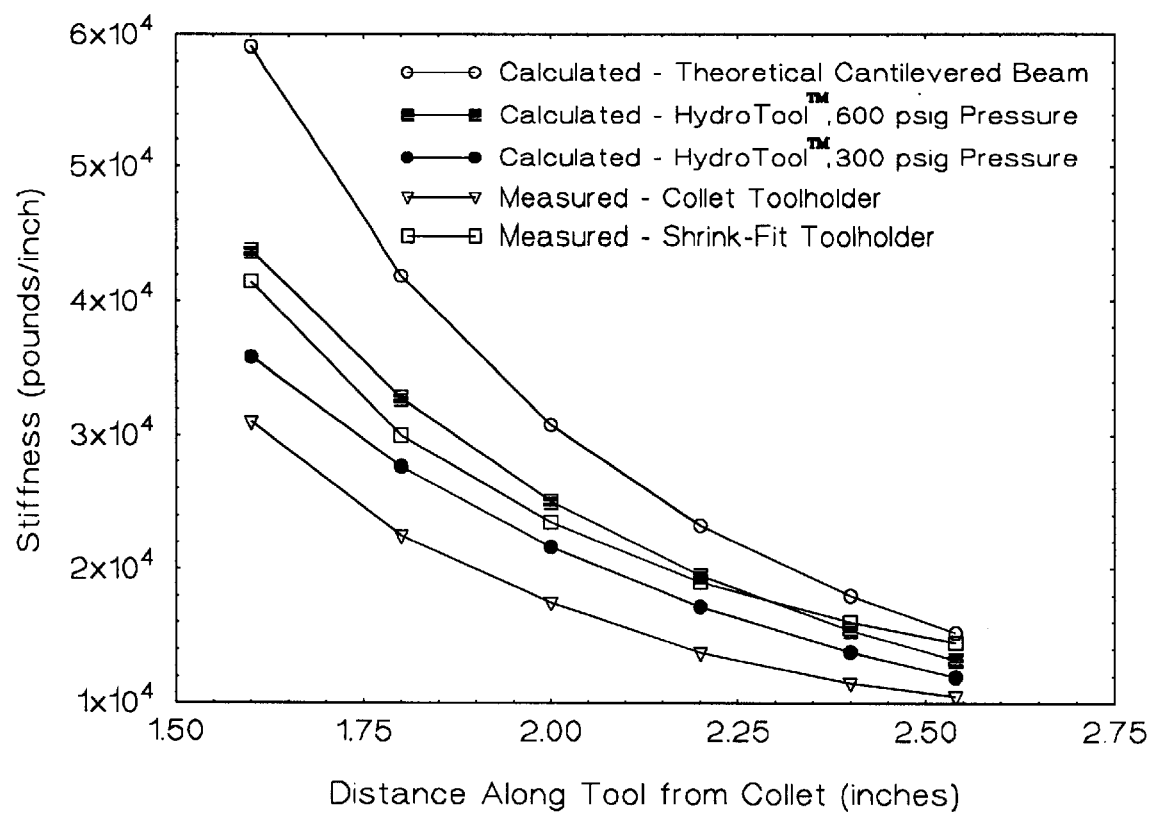
FIG. 8 is a plot showing stiffness of different prior art tool holding systems compared with the hydrostatic tool holder of the invention.

The static stiffness of the damped tool holders tested by applicants and called by the trademark HYDROTOOL™ and Q-TOOL™ will now be compared with the stiffness that may be achieved with other conventional tool-holding methods. For this comparison, a simulated tool was fabricated out of steel with a shank diameter of 0.63 inches and the simulated cutting portion of the tool had a 0.49 inch diameter uniform cross-section along its length. A force was applied at varying distance along the length of the tool and its deflection was measured at the point of applied force for each case. FIG. 8 shows the measured stiffness (applied forced divided by measured deflection) for two tool holders: a commercial clamping-collet type tool holder, and a commercial shrink-fit type tool holder. As shown, the shrink-fit tool holder had a considerably higher stiffness than the collet tool holder.

The static bending of the hydrostatic tool holder (HYDROTOOL™) was next simulated using a computational model for predicting the static stiffness of spindles held by the hydrostatic bearings of the current invention. This computational model was developed under a doctoral research program and was benchmarked against measured spindle stiffness data [see Wasson, Kevin L. "Hydrostatic Machine Tool Spindles" Doctoral Thesis, Department of Mechanical Engineering, Massachusetts Institute of Technology, Cambridge, Mass., May 1996.] This computation model uses advanced fluid-flow calculations to compute the bearing stiffness, combined with finite element computations to compute the bending of the shaft and obtain the spindle stiffness.

FIG. 8 shows the calculated stiffness of a HydroTool with a shank diameter of 1.25 inches and an extension diameter of 0.49 inches. The bearing length used was 1.5 inches and the bearing clearance used was 0.0006 inches on radius. The material properties used in the calculations were that of steel: elastic modulus of $30 \times 10^6$ psi, Poisson ratio of 0.3. Two supply pressures used in the calculations were 300 psi and 600 psi. As shown in FIG. 8, the calculations show that the static stiffness of the HydroTool is higher than that of the collet-type tool holder for all cases. The static stiffness of the HydroTool is higher than that of the shrink-fit type tool holder only when a supply pressure of 600 psi is used.

It is instructive to compare the measured and predicted stiffness of the various tool-holding mechanisms with the theoretical maximum stiffness possible: that of a cantilevered beam which is held rigidly at its base such that there is no deflection or rotation at the base of the beam. Classical beam theory, modified to include the effect of shear deformations, yields the following equation to predict the stiffness of the beam:

$$K = \frac{\frac{EI}{L^3}}{\frac{1}{3} + \frac{2(1+v)I}{AkL^3}}$$

where E is the elastic modulus of the material, v is the Poisson ratio of the material, L is the length of the beam, A is the cross-sectional area of the beam ($A=\pi D^2/4$ where D is the diameter of the solid circular beam), I is the cross-section bending moment of inertia of the beam ($I=\pi D^4/64$), and k is called the shear correction factor and is used to include the effect of shear deformations that occur in a bending beam. For a solid circular beam, k is equal to 0.91.

Shown in FIG. 8 is also the stiffness calculated for such a theoretical, cantilevered beam. Again, the material properties of the beam used in the calculations were that of steel: elastic modulus of $30 \times 10^6$ psi, Poisson ratio of 0.3. The diameter of the beam was 0.49 inches. As shown, none of the tool-holding mechanisms achieves a stiffness equal to that of the theoretical cantilevered beam; however, it is instructive to compare their stiffness with that of the theoretical maximum possible.

Next consider the load capacity of the HydroTool. The same bending calculations described above that were used to calculate the stiffness of the tool were also used to calculate at what applied force the tool will deflect to such an extent that it will touch down onto the housing of the HydroTool. This force is deemed the load capacity. Touch-down will certainly not result in failure, but it will result in a non-linear stiffness and a considerable change in the dynamics of the tool; and the full benefit of the damping capabilities of the HydroTool will not be realized. Thus, it is desirable to design the HydroTool system to be able to withstand the expected machining forces without touch- down.

Figure 9:
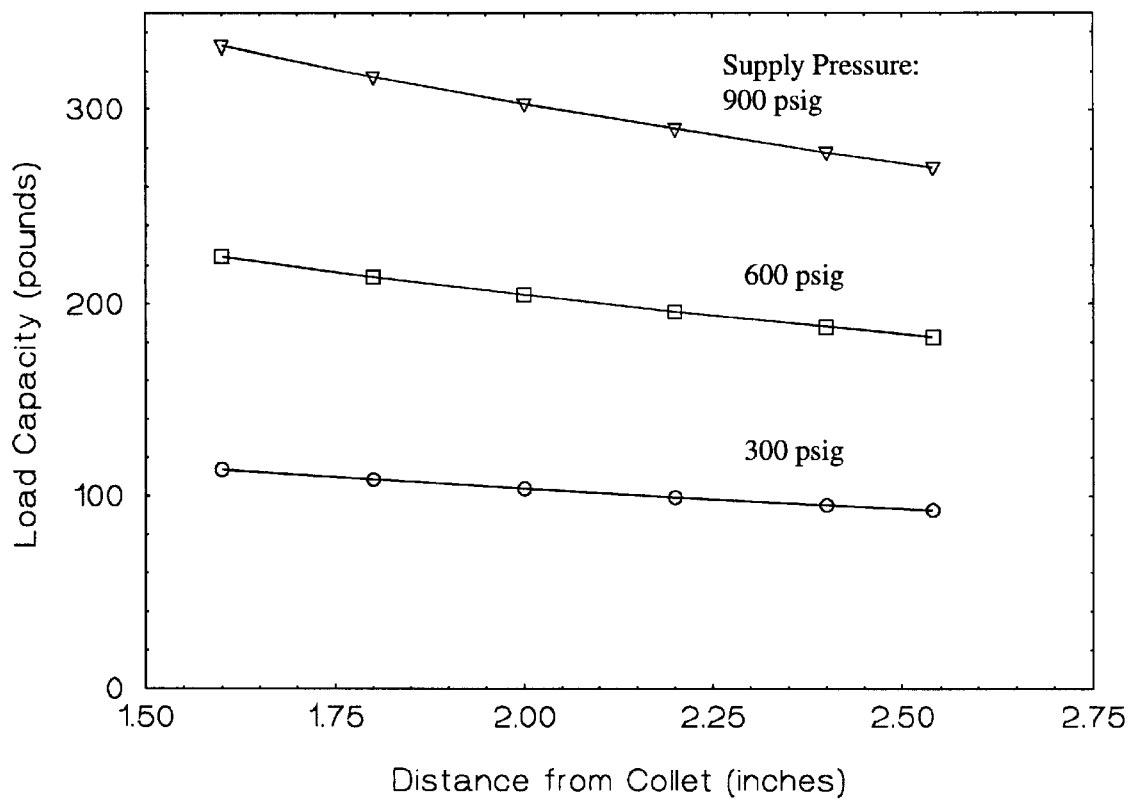
FIG. 9 is a plot showing load capacity of the hydrostatic tool holder of the invention.

FIG. 9 shows the calculated load capacity of the HydroTool for three different supply pressures. Again, the shaft of the tool was 1.25 inches in diameter; the diameter of the cutting part of the tool does not affect the load capacity computations. As shown, the tool is capable of withstanding approximately 300 pounds of radial force when a supply pressure of 900 psi is used. If this force is exceeded, then all that happens is that the bearing is grounded, which is not detrimental because there is no relative motion between the bearing surfaces. Thus there is self-protection built into the system.

Figure 10:
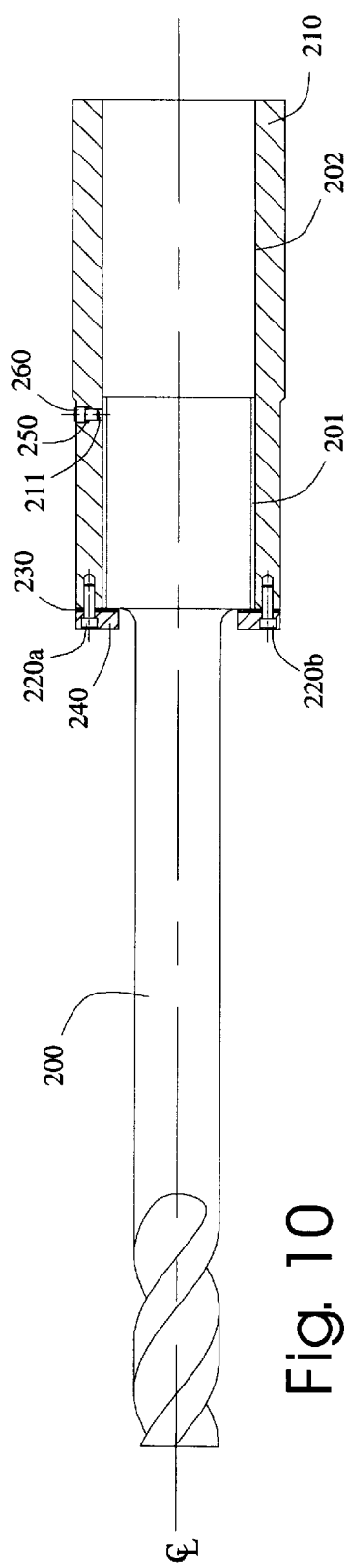
FIG. 10 is a cross section of a modification wherein the tool system uses a viscous fluid contained within a clearance between the tool and its sleeve.

So far, annular hydrostatic bearings have been considered as a damping mechanism. However, a fluid film filled annulus, where the motion of the fluid is controlled so as to not leak out, can also be used. Again, an important part of the design is tuning the relative dimensions of the components to obtain the correct stiffness and damping. FIG. 10, accordingly, shows a cross section of a further modification of the present invention in which the tool 200 is shrink-fitted tightly into an outer sleeve 210 at the shank 202 of the tool 200. Outer sleeve 210 may be gripped within the collet of a conventional tool holder. In this tool system, however, there are no bearing grooves formed into tool 200; by eliminating the bearing grooves a higher degree of damping is achieved, although the tool stiffness is decreased. There is a clearance 201 between tool 200 and sleeve 210, and in this construction the clearance contains a viscous fluid. The fluid is pumped into clearance 201 through hole 211 and is then sealed by an elastomer material 250 which is contained by screw 260 and sleeve 210. The fluid is sealed on the end of sleeve 210 by an elastomer seal 230, a retention member 240, and a plethora of screws, 220a and 200b shown in FIG. 10 as typical. The viscous fluid contained in clearance 201 also acts to damp, by the mechanism of squeeze film damping. The vibrations of tool 200 as it is excited by a vibration force at its cutting end are thereby damped. The clearance 201 is sized to provide a given amount of damping to tool 200 with the amount of damping readily evaluated by calculating the damping constant with the following formula:

$$B = \frac{6\pi R^3 L \mu}{h^3}$$

where R is the radius of the shank 201, L is the length of the clearance 201, $\mu$ is the dynamic viscosity of the fluid, and h is the magnitude of clearance 201. The viscosity of the fluid and the clearance should be sized to provide an optimal amount of damping to the tool, as determined by dynamic simulations of the tool bending using finite element structural calculations, known by those skilled in the art of structural mechanics. The clearance, however, should be kept sufficiently large such that a desired magnitude of cutting force may be applied to the cutting end of tool 200 without causing tool 200 to bend to such an extent that there is contact between tool 200 and sleeve 210, at which point a loss of damping occurs. The bending of the tool 200 may be simulated using formulas for bending beams which are known by those skilled in the art of structural mechanics, allowing clearance 201 to be sized to provide maximum damping, but adequate load capacity.

Figure 11:
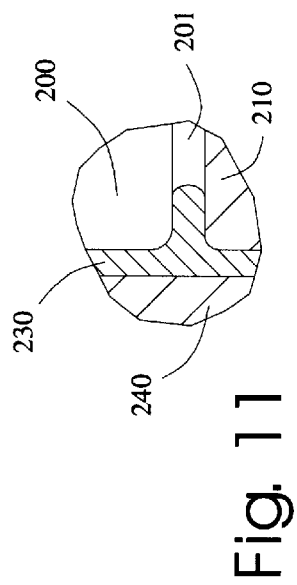
FIG. 11 is an enlarged section view of the elastomer seal which is extruded into the gap between the tool and sleeve of the viscously damped tool system of FIG. 10.

FIG. 11 shows an enlarged sectioned view of the elastomer seal 230, which is extruded into the gap 201 between the tool 200 and sleeve 210. This seal method is particularly effective for enabling the maximum damping of tool 200 because the elastomer 230 extrudes around the corner radii of the tool 200 and the sleeve 210, thereby completely sealing the end of gap 201. A normal O-ring seal with space on the pressurized side of the O-ring will not serve as an effective damper, because the circumferential O-ring groove is rectangular in cross section and the O-ring is found and the circumferential annulus between the two acts as a short circuit fluid path. The sealing arrangement of FIG. 11, on the other hand, eliminates the circumferential hydraulic short that an O-ring groove would present. In addition, the squeeze film pressure, pushing on the extruded lobe of elastomer 230, will cause it to undergo Poisson expansion and seal even better. A gasket, furthermore, would not have this sort of self-help mechanism and therefore would be less reliable.

Although the shank portion 201 of tool 200 is shown in FIG. 10 to be of greater diameter than the overhanging portion of tool 200, in some cases it is desirable for these diameters to be equal in order to minimize tool cost. Also, the damping sleeve 210 can be made with a uniform outer diameter in order to minimize machining costs.

Figure 13:
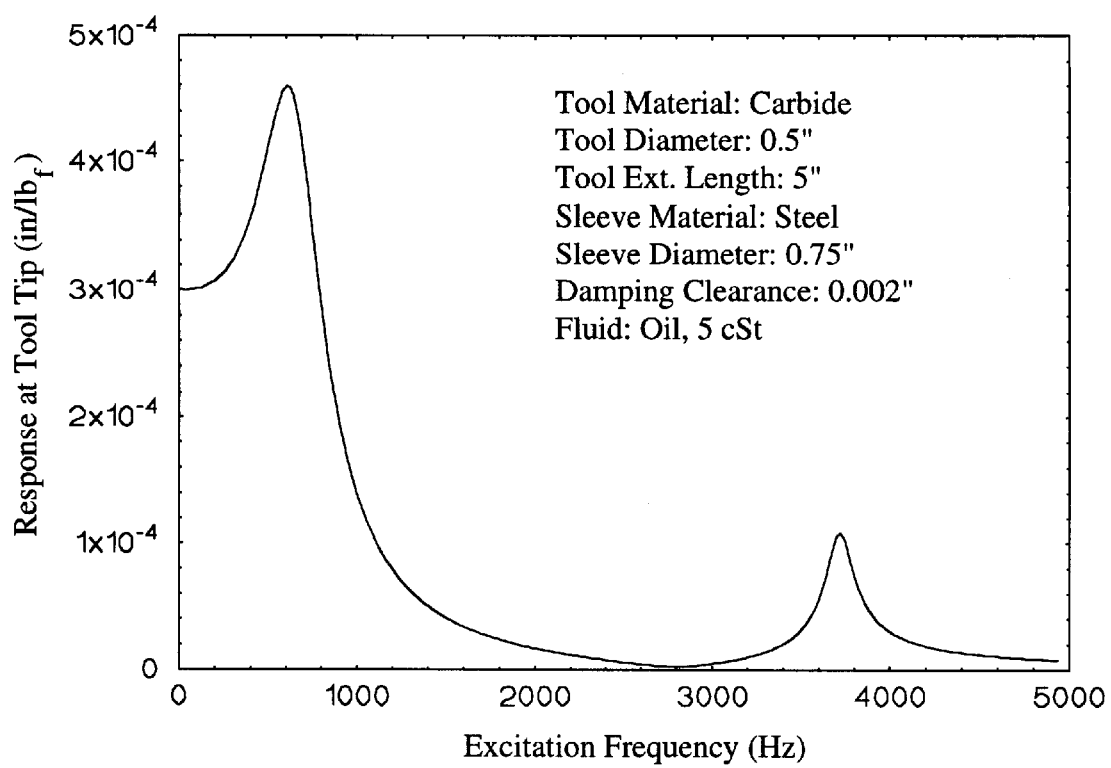
FIG. 13 is a plot of the calculated dynamic deflection of the outer end of a tool system of the type shown in FIG. 10 when it is excited by a sinusoidal dynamic force at a series of excitation frequencies, and with three different damper clearances used in the calculations.

FIG. 13 shows a plot of the calculated dynamic deflection of the outer end of a tool 200 when it is excited by a sinusoidal dynamic force at a series of excitation frequencies. The deflection in inches has been divided by the magnitude of the applied force in pounds on the abscissa of the plot. The simulations of FIG. 13 were performed using finite element structural calculations, known by those skilled in the art of structural mechanics, for a tool 200 made of carbide with an elastic modulus of $60 \times 10^6$ psi and density of 0.513 pounds per cubic inch. The tool shank had a diameter of 0.5 inches and a damping length of 2.0 inches. The tool 200 has a diameter of 0.5 inches and an extended length of 3.0 inches from the shank 201 to the tip of tool 200. A damper radial clearance of 0.002 inches was used in the calculations. A light-weight spindle oil, with a dynamic viscosity of 0.005 $Nm^2/s$, was used as the damping fluid. As shown in FIG. 13, the magnitude of the dynamic deflection increases as the frequency of the oscillatory force is increased from 0 Hertz to 800 Hertz, where it reaches a maximum. This maximum dynamic deflection indicates that the first "natural", or "resonant" frequency of the tool system is approximately 800 Hertz for this case. The ratio of dynamic deflection at resonance to the static deflection at 0 Hertz is typically termed the Q of the system, and is equal to 1.53 in this case. A tool such as this example which vibrates only minimally when excited by a dynamic cutting force is very desirable because it less likely to experience "chatter" during the machining process.

Figure 12:
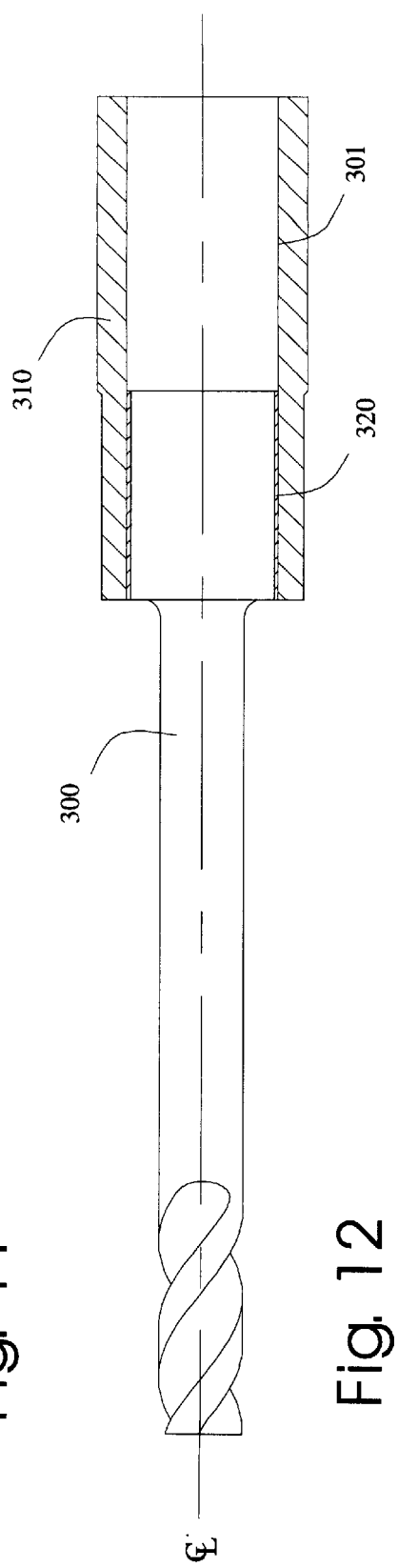
FIG. 12 is a cross section of a further modification in which a viscous solid material is contained within a clearance between the tool and its sleeve.

FIG. 12 shows a cross section of still another tool system modification of the present invention in which the tool 300 is shrink-fitted tightly into an outer sleeve 310 at the shank 301 of the tool 300. Outer sleeve 310 may be gripped within any conventional tool holder. There is a viscous solid material 320 between the tool 300 and the sleeve 310. This material may be an elastomer type or other damping material sold commercially. The viscous material acts to damp the vibrations of tool 200 as it is excited by a vibration force at its cutting end. The tool system of FIG. 12 is desirable because it is the most simple form of the present invention, and may be used in cases where both damping and stiffness at the tool is desired using a conventional tool-holding mechanism.

Although the shank portion 301 of tool 300 is shown in FIG. 10 to be of greater diameter than the overhanging portion of tool 300, in some cases it is desirable for these diameters to be equal in order to minimize tool cost. Also, the damping sleeve 310 can be made with a uniform outer diameter in order to minimize machining costs.

While the above designs require some special tool designs, or shrinking of a special sleeve onto a standard tool, the general method of providing two-region support to the tool in order to locate and damp, achieves a resultant force couple, and creates a standard easy-to-rapidly-change tool-holding system. Conventional systems, such as the before-mentioned HydroLock toolholder, grip the tool at essentially one region, not by a spaced force couple, and thus, as shown on the comparative stiffness plots, above-described, they are far less stiff than the force-couple damped designs of the present invention.

FIG. 14 shows an isometric of a standard tool 310 held in a further modified force-couple clamping design 350. The tool 310 is held in a clamping sleeve 320, and screws 343A and 343B are tightened to increase internal pressure in two distinct tool-gripping regions. FIGS. 15 and 16 show the details of the mechanism. The special sleeve 320 has regions 328a, 328b, and 328c that would make shrink-fit contact with the bore 347 of the solid collet structure 351. Surfaces 329A and 329B are a few thousandths of an inch smaller in diameter than surfaces 328, according to the damping design analysis described above. This enables viscous fluid in regions 340A and 340B to act as a squeeze film damper.

The tool 310 fits into sleeve 320's center bore 352, but clearance is maintained at locations 344A and 344B. O-ring sealed screws 343A and 343B are tightened, and fluid in regions behind the screws 342A and 342B is forced into regions 340A and 340B. These regions are kept separated, and thus structures 329A and 329B circumferentially squeeze the tool at contact areas 345A and 345B, because they are separated from the main structure 320 by flexural bearing slits 341. The design of these slits, circumferential and in some cases axial, is easily accomplished by those skilled in the art of collect design. The slits, moreover, are best put on the inside of the bore 352, because if they were on the outside, circumferential short circuits would be created in the squeeze film dampers and the damping would drop significantly.

The collet system 350 could be used in place of the collet system shown in FIG. 3. It would be held in a standard toolholder for machine tools such as the CAT type toolholder 40 shown in FIG. 2, or with other systems such as HSK that allow the tools to be automatically handled in CND machine tools.

The key to the damped isostatic pressure clamped systems of the invention that differentiates it from other system is the use of two distinct non-communicative pressure zones. In a conventional single cavity or zone system, when a force is applied to the tool tip, the tool shaft bends, and the moment is resisted by the front of the tool touching down on a hard stop, and the back of the tool touching down on a hard stop. The isostatic pressure clamp only acts to keep the mean center of the tool centered. It cannot support a moment load because the fluid just moves axially.

In the design shown in FIG. 16, the two separate cavities 340A and 340B create a force couple at the interfaces 345A and 345B. Each of these regions is well damped, and thus a change in the gap in cavities 340A and 340B causes the fluid to have to travel circumferentially around to the other side of the cavity, and it is this long path length that creates a huge squeeze-film damping effect.

Figure 17:
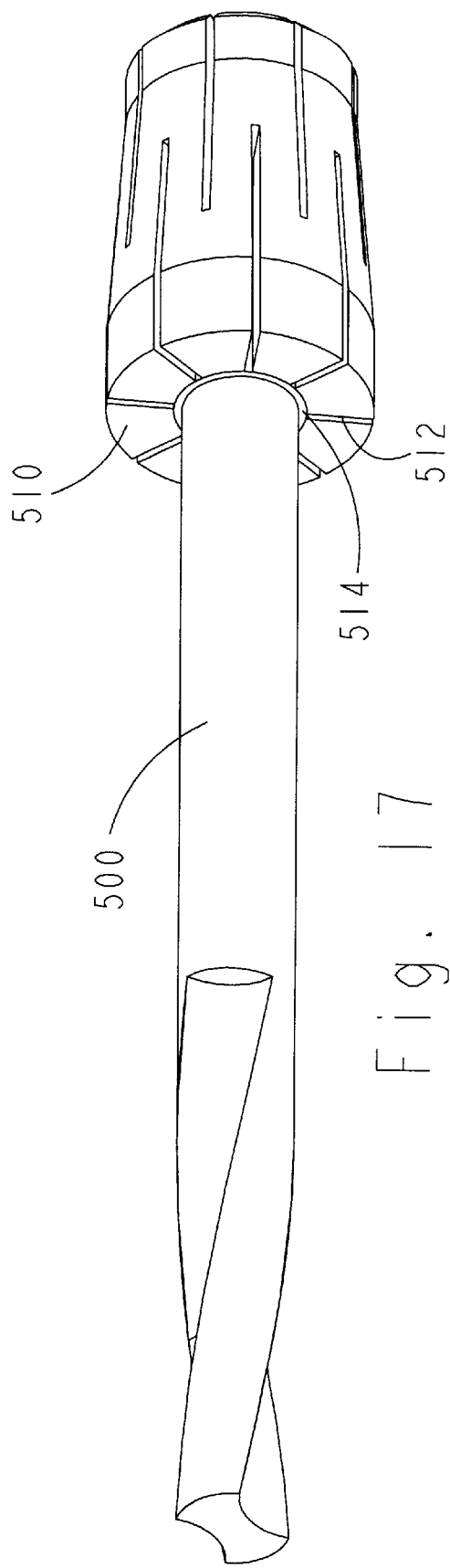
FIG. 17 is an isometric view of a modified version of the damped toolholder that uses a standard slit collet and a tool with a viscoelastic damping sleeve.

FIG. 17 shows still another modification embodying a viscoelastically damped shaft, where a tool 500 is held in a standard slit collet 510 in turn held in a standard toolholder, and where the tool has an enlarged diameter 516 in a portion of the region 517 where it is gripped by the collet 510. A cylindrical viscoelastic element 514 fits over the tool shank near the enlarged region 516, such that when the collet is clamped in its holder, the slits 512 allow it to contract and rigidly grip the enlarged tool region, and compress the viscoelastic tubular element 514. When radial loads are applied to the tool, the viscoelastic element deflects and dissipates energy. In general, the spring rate of the tubular element would be equal to the bending stiffness of the tool. Exact tuning can be done using the before-referenced finite element analysis, which is known to those skilled in the art.

Figure 18:
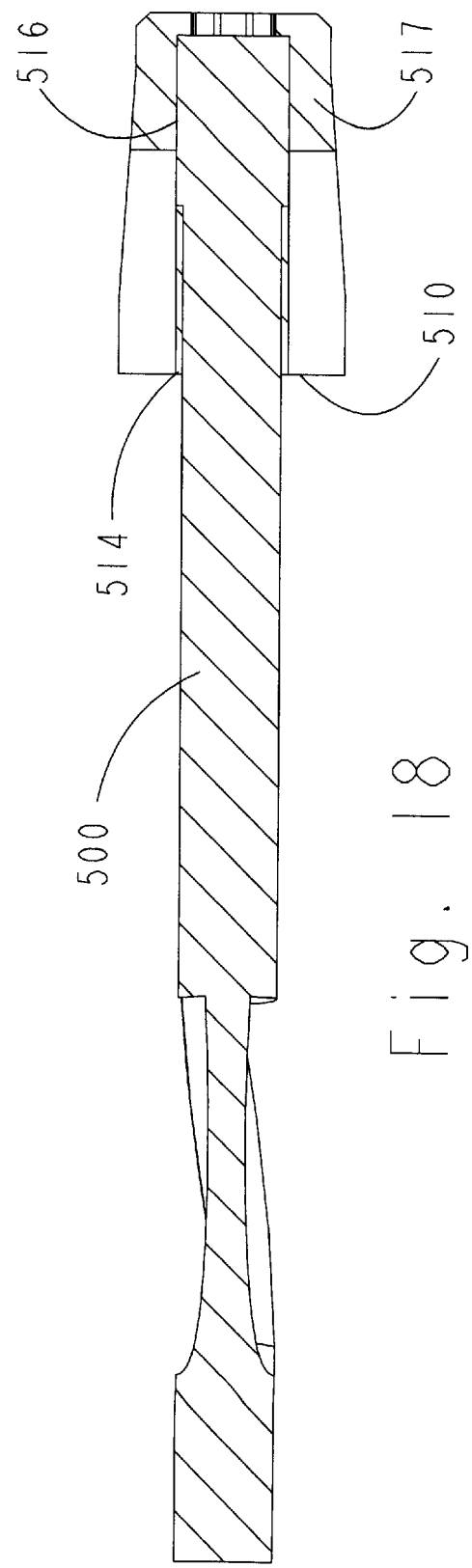
FIG. 18 is a cross sectional view of the damped toolholder of FIG. 17.

In some cases, the viscoelastic element 510 in FIG. 18 may not have sufficient area, and it can also become damaged in sliding. To alleviate this problem, FIGS. 19 and 20 show a viscoelastic or other lossy material 614 sandwiched between inner and outer collet rings 610b and 610a, respectively. The damped material could be injection molded between the rings, which would produce a robust damping element where the slit collet structure of the inner and outer rings allows the damping element to be pressed over a shaft and then radially held in place by a circumferential clamping pressure.

It should be noted that while the invention has been described with reference to tool shafts, the damping methods herein described can also be more generally applied to any type of similar structure or shaft that undergoes bending vibrations that are to be damped. This would include ballscrew shafts, turbine shafts, and driveshafts, to name a few.

Further modifications of the invention will also occur to persons skilled in this art, and all such are deemed to fall within the spirit and scope of the invention as defined by the appended claims.

What is claimed is:

1. A damped toolholder system having, in combination, a longitudinally extending cylindrical tool provided with a forward outer cutting or operating end and a rearward inner end which is to be held within a toolholder; a coaxial toolholder receiving the inner end of the tool; a rigid mechanical support connection between the tool and the toolholder at a first region thereof; and a second annular support connection between the tool and the toolholder at a second region thereof spaced from but adjacent the first region and effected by a vibration-damping annular film structure disposed therebetween at said second region, wherein the tool fits closely within the toolholder and the damping film is of the order of tens of microns in thickness.

2. The damped toolholder system of claim 1 wherein the first and second support connections serve accurately to locate the tool at all times and to act as a spaced force couple for damping moment loads applied to the forward end of the tool.

3. The damped toolholder system of claim 2 wherein the first and second support connections hold the tool against rotary motion between the tool and the tool holder.

4. The damped toolholder system of claim 3 wherein the damping structure comprises an annular hydrostatic fluid-film bearing.

5. The damped toolholder system of claim 4 wherein the hydrostatic bearing comprises flow-compensating fluid grooves provided on the circumferential surface of the tool or sleeve integrated therewithin at said second region.

6. A damped toolholder system having, in combination, a longitudinally extending cylindrical tool provided with a forward outer cutting or operating end and a rearward inner end which is to be held within a toolholder; a coaxial toolholder receiving the inner end of the tool; a rigid mechanical support connection between the tool and the toolholder at a first region thereof; and a second annular support connection between the tool and the toolholder at a second region thereof spaced from but adjacent the first region and effected by a vibration-damping annular film structure disposed therebetween at said second region, wherein the first and second support connections serve accurately to locate the tool at all times and to act as a spaced force couple for damping moment loads applied to the forward end of the tool and, the first and second support connection hold the tool against rotary motion between the tool and the tool holder, and wherein the damping structure comprises an annular hydrostatic fluid-film bearing that comprises flow-compensating fluid grooves provided on the circumferential surface of the tool or sleeve integrated therewithin at said second region and wherein the film is introduced through an axial hole in the inner end of the tool and thence through a radial hole therein and upward into the region of the grooves.

7. The damped toolholder system of claim 1 wherein the annular damping structure contains a damping film of one of a hydrostatic or aerostatic bearing, a passive fluid-filled squeeze-film zone, a viscoelastic film, and a bearing material film.

8. A tool holding system wherein the tool is shrunk-fit onto a sleeve; a radial hole is provided in the tool for connecting a through-tool coolant supply hole in the center of the tool with a circumferential pressure supply groove provided in the sleeve; one end of the sleeve being rigidly held in a solid collet, and the other end of the sleeve being provided with a surface self-compensated hydrostatic bearing that keeps the sleeve centered with respect to the solid collet; and the solid collet being held by a nut in a standard collet type tool holder.

9. The tool holding system of claim 8 wherein the hydrostatic bearing is a groove-compensated hydrostatic or aerostatic bearing, with compensation provided by a fluid flow restrictor.

* * * * *